US008855462B2

(12) United States Patent
Yu et al.

(10) Patent No.: US 8,855,462 B2
(45) Date of Patent: Oct. 7, 2014

(54) VIDEO PLAYBACK SYSTEM FOR ENHANCING DRAMA EFFECT AND RELATED COMPUTER PROGRAM PRODUCT

(71) Applicant: Realtek Semiconductor Corp., Hsinchu (TW)

(72) Inventors: Siu-Leong Yu, Zhubei (TV); Shih-Chun Wei, Hsinchu (TW); Chen Ma, San Jose, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/845,970

(22) Filed: Mar. 18, 2013

(65) Prior Publication Data

US 2013/0266285 A1    Oct. 10, 2013

Related U.S. Application Data

(60) Provisional application No. 61/620,988, filed on Apr. 6, 2012, provisional application No. 61/727,745, filed on Nov. 18, 2012.

(30) Foreign Application Priority Data

Feb. 8, 2013    (TW) .............................. 102105439 A

(51) Int. Cl.
*H04N 5/932*    (2006.01)
*H04N 5/935*    (2006.01)
*H04N 5/775*    (2006.01)
*H04N 5/92*    (2006.01)
*H04N 5/93*    (2006.01)

(52) U.S. Cl.
USPC ........... 386/218; 386/219; 386/230; 386/326; 386/353

(58) Field of Classification Search
CPC . H04N 1/00; H04N 2005/00; H04N 2101/00; H04N 2213/00
USPC .......................... 386/218, 219, 230, 326, 353
See application file for complete search history.

(56) References Cited

U.S. PATENT DOCUMENTS

| | | | |
|---|---|---|---|
| 6,580,870 B1 * | 6/2003 | Kanazawa et al. ............. | 386/240 |
| 7,652,638 B2 * | 1/2010 | Takano et al. .................. | 345/2.1 |
| 8,396,931 B2 * | 3/2013 | Rothschild .................... | 709/206 |

* cited by examiner

*Primary Examiner* — Daquan Zhao
(74) *Attorney, Agent, or Firm* — Birch, Stewart, Kolasch & Birch, LLP

(57) ABSTRACT

A video playback system for enhancing drama effect is disclosed, including: a video playback device having a main display to playback a target video; a first portable communication device having a first screen for displaying a first auxiliary image; and a drama effect enhancing server configured to operably transmit content of the target video to the video playback device via a network and to operably transmit content of the first auxiliary image to the first portable communication device via a network. When the target video playbacked on the main display reaches a first target point of time, the drama effect enhancing server instructs the first portable communication device to utilize the first screen to begin displaying the first auxiliary image.

26 Claims, 9 Drawing Sheets

VIDEO PLAYBACK SYSTEM FOR ENHANCING DRAMA EFFECT AND RELATED COMPUTER PROGRAM PRODUCT

CROSS-REFERENCE TO RELATED APPLICATIONS

This application claims the benefit of priority to Patent Application No. 102105439, filed in Taiwan on Feb. 8, 2013; the entirety of which is incorporated herein by reference for all purposes.

This application claims the benefit of priority to U.S. Provisional Application Ser. No. 61/620,988, filed on Apr. 6, 2012; the entirety of which is incorporated herein by reference for all purposes.

This application claims the benefit of priority to U.S. Provisional Application Ser. No. 61/727,745, filed on Nov. 18, 2012; the entirety of which is incorporated herein by reference for all purposes.

BACKGROUND

The disclosure generally relates to a video playback system and, more particularly, to the video playback system for enhancing drama effect and related computer program products.

Movie theaters are typically provided with video and audio playback systems having superior quality, and thus are the traditional choice of watching movies. As the advances of the development of multimedia applications, more and more people choose to install a home theater system with great audio and video performance at home, instead of going to the movie theaters for watching movies.

No matter the audiences choose to watch movies in the movie theaters or choose to watch videos at home by using the home theater system, the movie producer or the director can only rely on the pre-installed screen and audio system to playback the movie and create drama effects. Therefore, in the traditional video playback systems, only very limited tools are available for the movie producer or the director to deliver drama effect. Apparently, it is difficult for the movie producer or the director to create more diversified drama effects through the existing video playback systems, and it is thus difficult for the movie industry to provide the audiences with more rich and more different experience in watching videos.

SUMMARY

In view of the foregoing, it can be appreciated that a substantial need exists for video playback systems that can enhance the drama effect of the videos.

An example embodiment of a video playback system for enhancing drama effect is disclosed, comprising: a video playback device, comprising a main display configured to operably playback a target video; a first portable communication device, comprising a first screen configured to operably display a first auxiliary image; and a drama effect enhancing server, configured to operably transmit content of the target video to the video playback device via a network, and to operably transmit the first auxiliary image to the first portable communication device via a network; wherein when the target video playbacked on the main display reaches a first target point of time, the drama effect enhancing server instructs the first portable communication device to utilize the first screen to begin displaying the first auxiliary image.

An example embodiment of a computer program product is disclosed. The computer program product is stored in a non-transitory storage device of a drama effect enhancing server. When the computer program product is executed by a control circuit of the drama effect enhancing server, the computer program product enables the drama effect enhancing server to perform a video playback operation for enhancing drama effect. The computer program product comprises: a video providing module, configured to operably transmit content of a target video to a video playback device comprising a main display, so that the video playback device utilizes the main display to playback the target video; an auxiliary data providing module, configured to operably transmit a first auxiliary image to a first portable communication device comprising a first screen; and an instruction module, configured to operably instruct the first portable communication device to utilize the first screen to begin displaying the first auxiliary image when the target video playbacked on the main display reaches a first target point of time.

One advantage of the above embodiments is that the video producer or the director is enabled to utilize the popular portable communication devices as tools for creating drama effects, thereby greatly increasing the selection flexibility and variety of the tools for creating drama effects.

Another advantage of the above embodiments is that the cooperation of the portable communication device and the video playback device effectively enhances the drama effect of the target video, and provides more rich and more different experience in watching videos.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings. The same reference numbers may be used throughout the drawings to refer to the same or similar parts, components, or operations.

Figure 1:
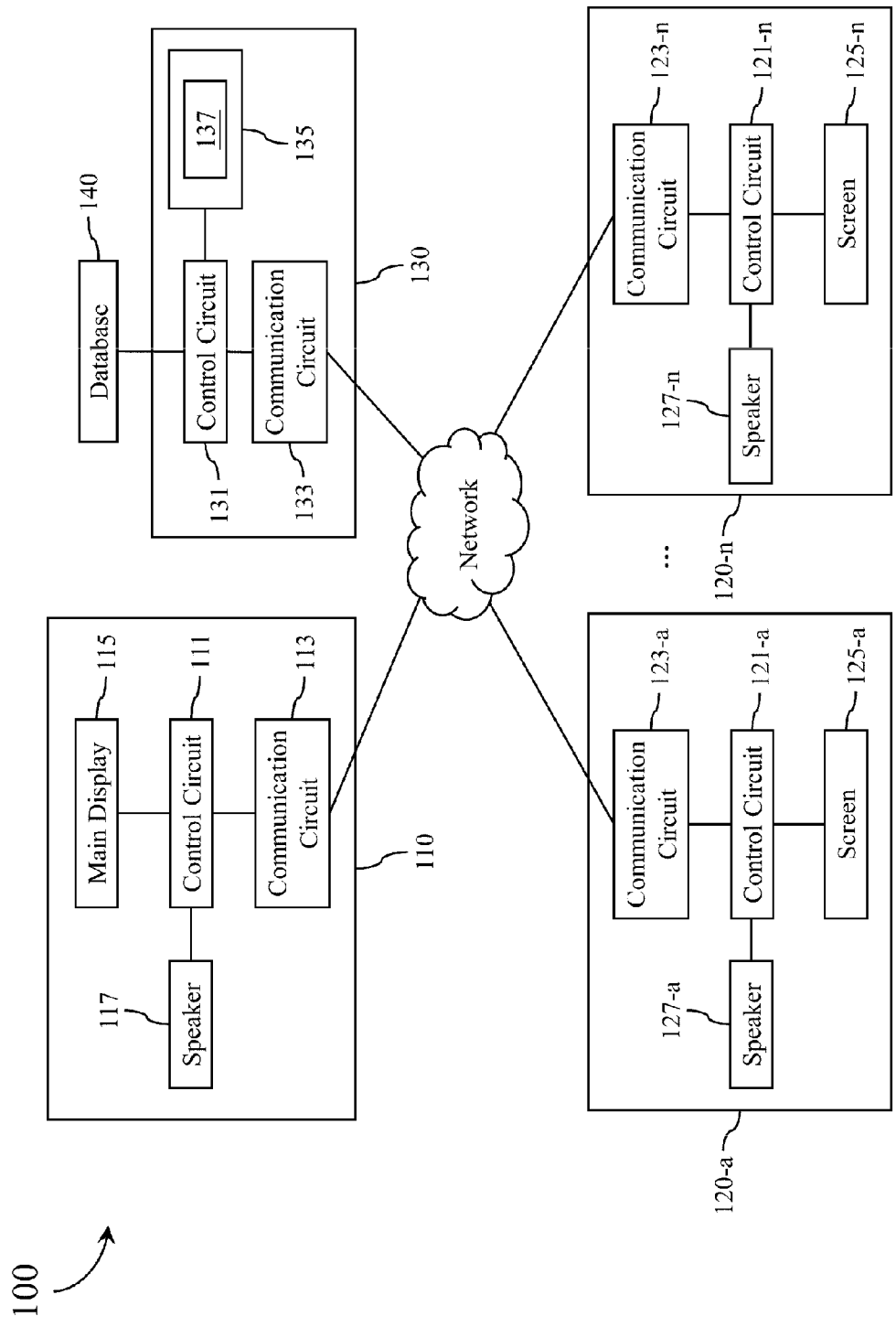
FIG. 1 shows a simplified functional block diagram of a video playback system according to one embodiment of the present disclosure.

FIG. 1 shows a simplified functional block diagram of a video playback system 100 according to one embodiment of the present disclosure. The video playback system 100 comprises a video playback device 110, one or more portable communication devices 120 (portable communication devices 120-a~120-n are shown in FIG. 1 as examples), a drama effect enhancing server 130, and a database 140. In the video playback system 100, the video playback device 110 is configured to operably playback a target video that the users of the portable communication devices 120-a~120-n would like to watch. The database 140 is configured to operably store the content of the target video, and one or more auxiliary images and auxiliary audio data corresponding to the target video.

In practice, the producer or director of the target video may design additional images and audio data that can be playbacked by the portable communication devices 120 for the movie plots of one or more specific points of time in the target video, and store the additional images and audio data in the database 140 as auxiliary images and auxiliary audio data. The aforementioned auxiliary image may be one or more static images, or dynamic image or video. When a specific movie plot appears while the video playback device 110 playbacks the target video, the drama effect enhancing server 130 instructs the portable communication devices 120-a~120-n to display corresponding auxiliary image of the movie plot, and/or playback corresponding auxiliary audio data of the movie plot. As a result, the producer or director of the target video is enabled to utilize the portable communication devices 120-a~120-n as tools to cooperate with the video playback device 110 to jointly create more diversified approaches for presenting the video content so as to enhance the drama effect of the target video.

Throughout the specification and drawings, indexes an may be used in the reference numbers of components and devices for ease of referring to respective components and devices. The use of indexes an does not intend to restrict the amount of components and devices to any specific number. In the specification and drawings, if a reference number of a particular component or device is used without having the index, it means that the reference number is used to refer to any unspecific component or device of corresponding component group or device group. For example, the reference number 121-a is used to refer to the specific control circuit 121-a, and the reference number 121 is used to refer to any control circuit of the control circuits 121-a~121-n. In another example, the reference number 120-a is used to refer to the specific portable communication device 120-a, and the reference number 120 is used to refer to any unspecific portable communication device of the portable communication devices 120-a~120-n.

As shown in FIG. 1, the video playback device 110 comprises a control circuit 111, a communication circuit 113, a main display 115, and a speaker 117. The aforementioned main display 115 may be a screen, a projector, or any other device that capable of playbacking videos. Each of the portable communication devices 120-a~120-n comprises a control circuit 121, a communication circuit 123, and a screen 125. The drama effect enhancing server 130 comprises a control circuit 131, a communication circuit 133, and a non-transitory storage device 135, wherein the storage device 135 is stored with a computer program product 137. Each of the control circuits 111, 121, and 131 may be realized with one or more processor units. Each of the communication circuits 113, 123, and 133 may be realized with a wired networking circuit, a wireless networking circuit, or a hybrid circuit integrated with the functionalities of the above wired networking circuit and the wireless networking circuit. In operations, the drama effect enhancing server 130 may communicate date with the video playback device 110 and the portable communication device 120 via a network.

In the video playback system 100, the video playback device 110 may be any device capable of playbacking videos, such as a computer, a TV, a home theater system, or a video and audio playback system in the movie theater. The portable communication devices 120 may be various portable electronic devices each has a screen and capable of connecting to a network. For example, the portable communication device 120 may be a mobile phone, a tablet computer, a notebook computer, a netbook computer, an electronic book, or a handheld game console. The aforementioned network may be the internet or an intranet adopting various communication protocols.

Figure 2:
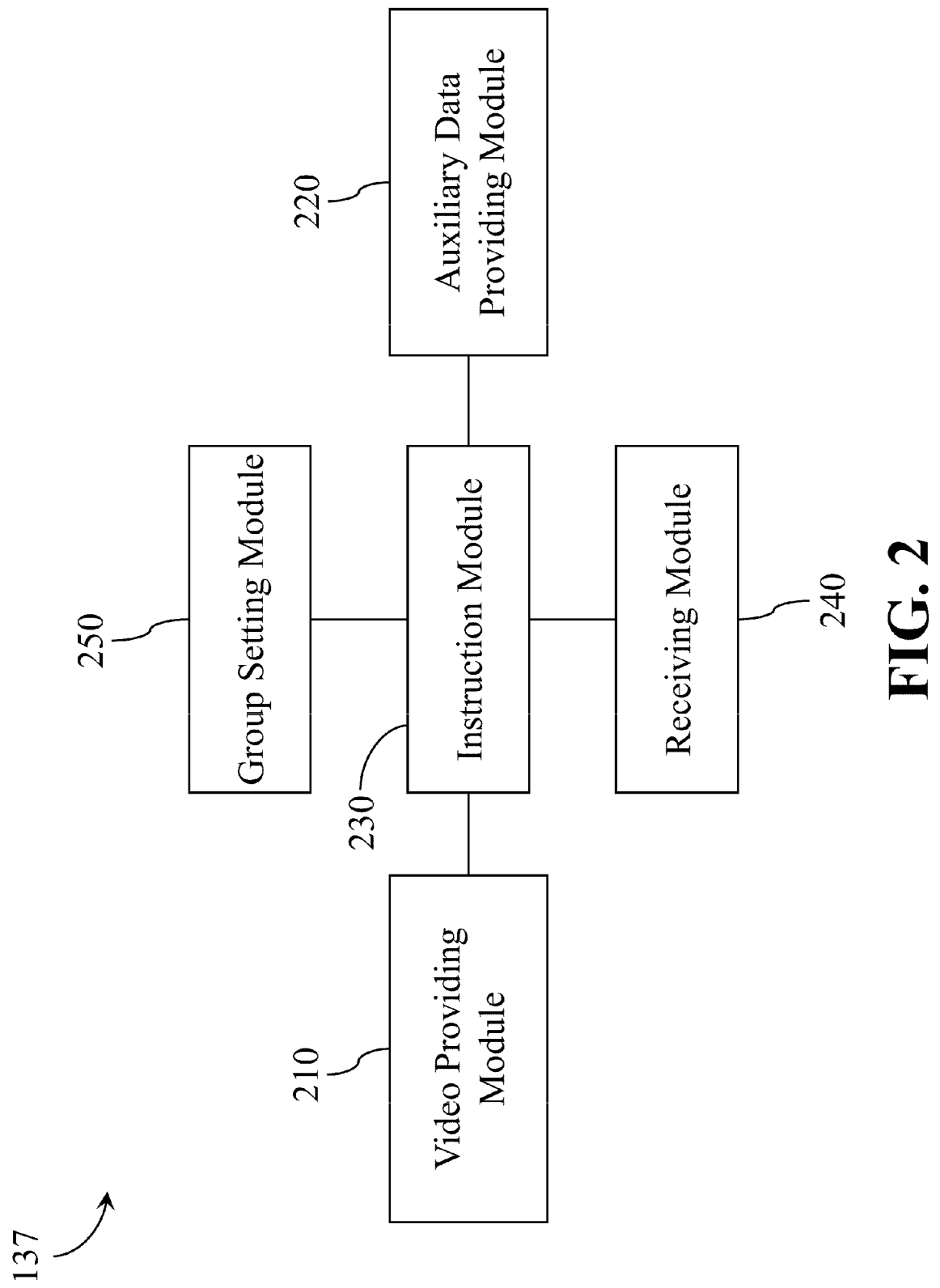
FIG. 2 shows a simplified schematic diagram of functional modules of the computer program product in the drama effect enhancing server in FIG. 1 according to one embodiment of the present disclosure.

The computer program product 137 in the drama effect enhancing server 130 may be realized with one or more application program modules. For example, FIG. 2 shows a simplified schematic diagram of functional modules of the computer program product 137 in the drama effect enhancing server 137 in FIG. 1 according to one embodiment of the present disclosure. In this embodiment, the computer program product 137 comprises a video providing module 210, an auxiliary data providing module 220, an instruction module 230, a receiving module 240, and a group setting module 250.

The operations of the video playback system 100 will be further described in the following with reference to FIG. 3 and FIG. 4.

Figure 3:
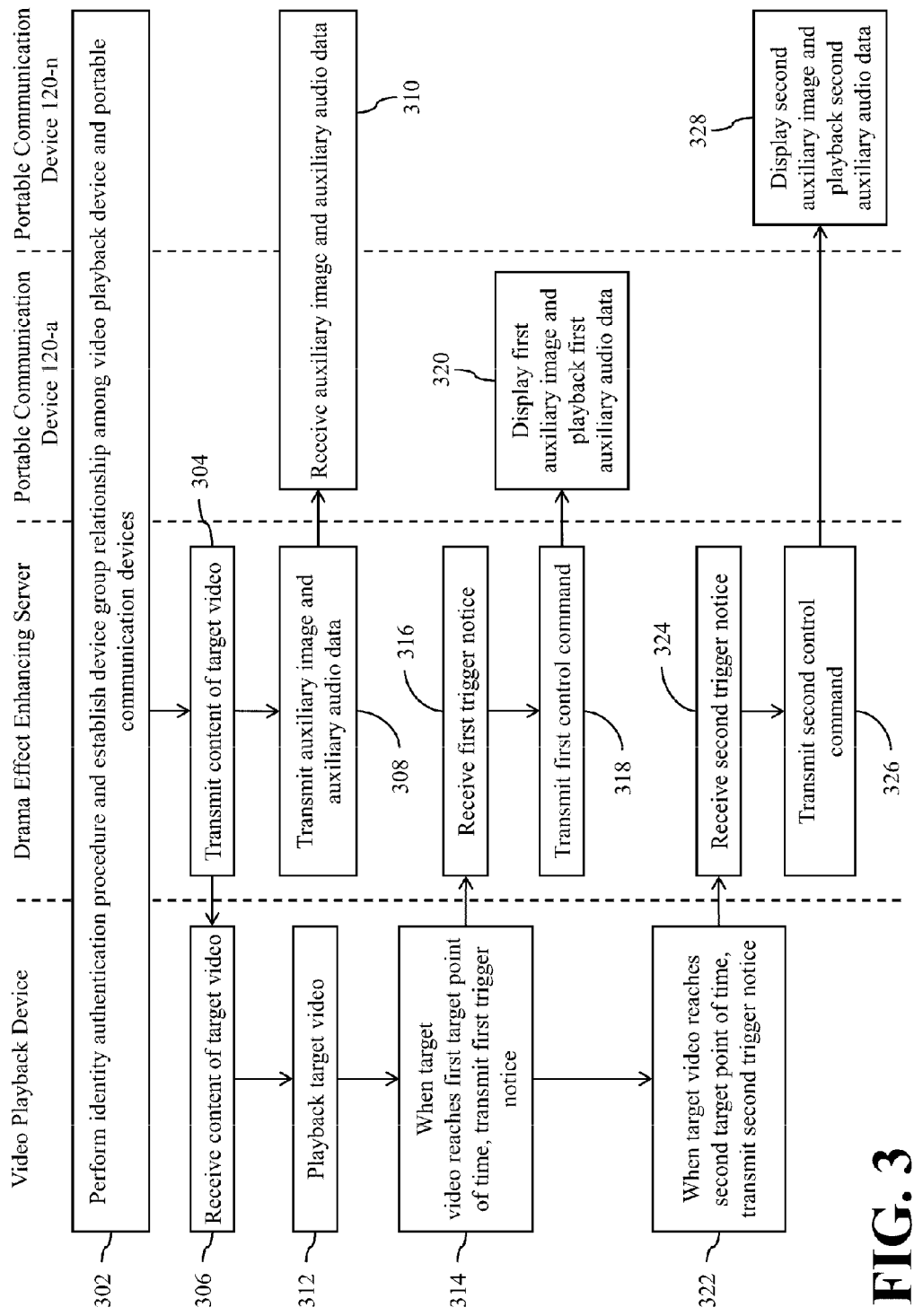
FIG. 3 and FIG. 4 show simplified flowcharts illustrating video playback methods for enhancing drama effect according to several embodiments of the present disclosure.
Figure 4:
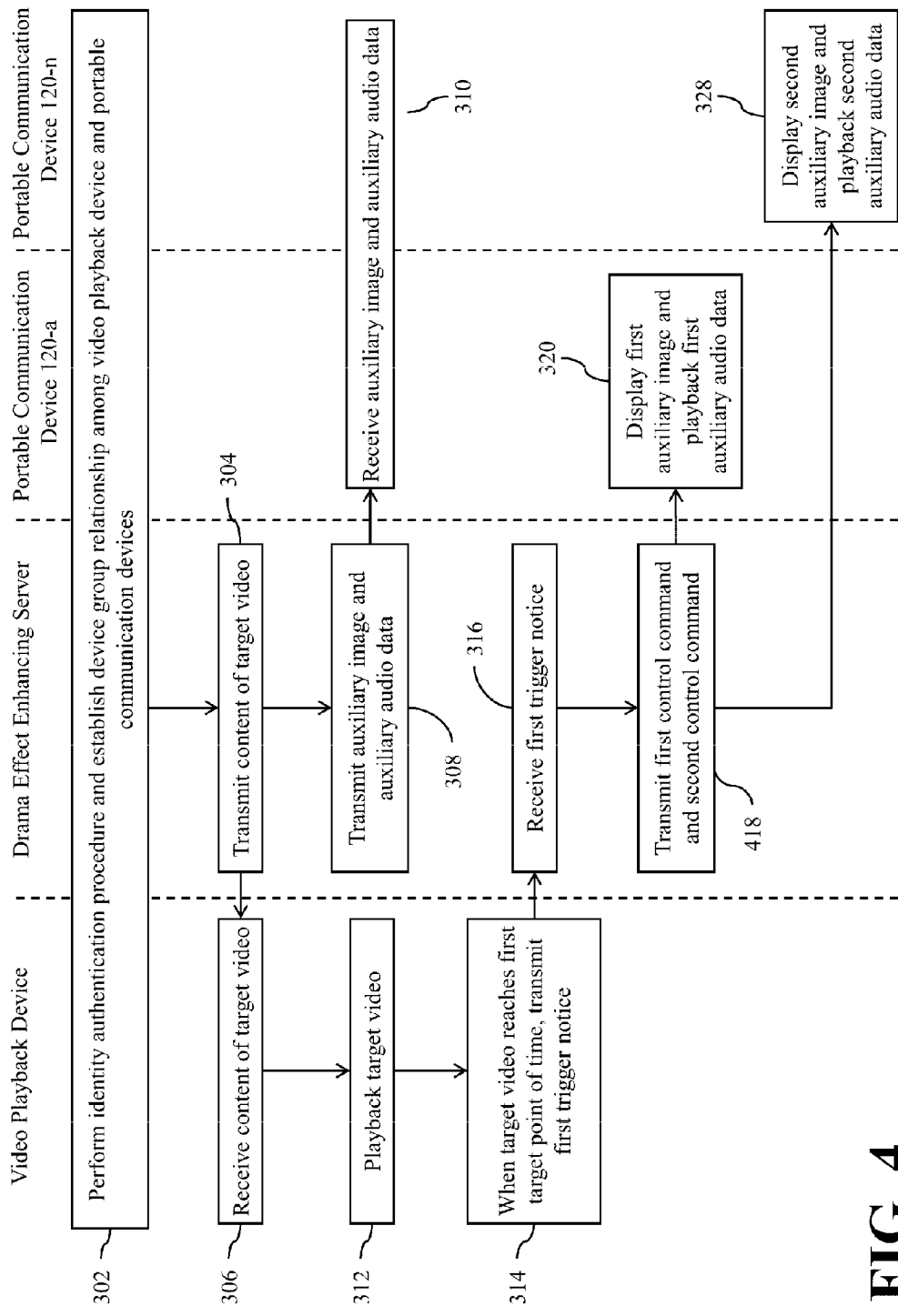

FIG. 3 and FIG. 4 show simplified flowcharts illustrating video playback methods for enhancing drama effect according to several embodiments of the present disclosure. In the flowchart of FIG. 3, operations within a column under the name of a specific device are operations to be performed by the specific device. For example, operations within a column under the label "video playback device" are operations to be performed by the video playback device 110; operations within a column under the label "portable communication device 120-a" are operations to be performed by the portable communication device 120-a; operations within a column under the label "drama effect enhancing server" are operations to be performed by the drama effect enhancing server 130; and so forth. The same analogous arrangement also applies to the subsequent flowcharts.

When performing the video playback method of each flowchart in the drawings, the control circuit 131 of the drama effect enhancing server 130 executes the computer program product 137 to enable the drama effect enhancing server 130 to perform some or all operations within the corresponding column.

When the user of the portable communication device 120 want to watch the target video, the video playback device 110 and the portable communication device 120 may be utilized to perform an operation 302 to establish a device group relationship among the video playback device 110 and the portable communication devices 120-a~120-n.

In the operation 302, the video playback device 110 utilizes the communication circuit 113 to communicate with the drama effect enhancing server 130 via a network, and each the portable communication device 120 utilizes the communication circuit 123 to communicate with the drama effect enhancing server 130 via a network. Then, the group setting module 250 of the drama effect enhancing server 130 conducts an identity authentication procedure to the video playback device 110 and the portable communication devices 120-a~120-n, and establishes a device group relationship among the video playback device 110 and the portable communication devices 120-a~120-n.

For example, the group setting module 250 may request the user of the video playback device 110 to select or input a specific group ID. When other portable communication device 120 establishes a connection with the drama effect enhancing server 130, the drama effect enhancing server 130 may request the user of the portable communication device 120 to select or input a group ID. When the group ID configured by the portable communication device 120 matches with the group ID configured by the video playback device 110, the group setting module 250 sets the video playback device 110 and the portable communication device 120 using the same group ID as the same device group.

In an operation 304, the video providing module 210 of the drama effect enhancing server 130 extracts content of the target video to be watched by the user of the portable communication device 120 from the database 140, and utilizes the communication circuit 133 to transmit the content of the target video to the video playback device 110 via a network.

In an operation 306, the control circuit 111 of the video playback device 110 utilizes the communication circuit 113 to receive the content of the target video transmitted from the drama effect enhancing server 130.

In an operation 308, the auxiliary data providing module 220 of the drama effect enhancing server 130 extracts auxiliary images and/or auxiliary audio data corresponding to the target video from the database 140, and utilizes the communication circuit 133 to transmit the auxiliary images and/or auxiliary audio data to the portable communication devices 120-a~120-n via a network.

In practice, the auxiliary data providing module 220 may provide different auxiliary images and auxiliary audio data to different portable communication devices 120. For the purpose of explanatory convenience in the following description, it is assumed herein that the auxiliary data providing module 220 utilizes the communication circuit 133 to transmit a first auxiliary image and a first auxiliary audio data to the portable communication device 120-a, and to transmit a second auxiliary image and a second auxiliary audio data to the portable communication device 120-n.

In an operation 310, the control circuit 121 of the portable communication device 120 utilizes the communication circuit 123 to receive the auxiliary image and/or auxiliary audio data transmitted from the drama effect enhancing server 130.

In an operation 312, the control circuit 111 of the video playback device 110 utilizes the main display 115 and the speaker 117 to playback the video and audio content of the target video for the users of the portable communication devices 120-a~120-n to watch.

In the embodiment of FIG. 3, when the target video playbacked by the video playback device 110 reaches a first target point of time, it means that a specific movie plot of the target video is coming soon. At this time, the control circuit 111 of the video playback device 110 performs an operation 314 to utilize the communication circuit 113 to transmit a first trigger notice to the drama effect enhancing server 130.

In an operation 316, the receiving module 240 of the drama effect enhancing server 130 utilizes the communication circuit 133 to receive the first trigger notice transmitted from the portable communication device 120.

In an operation 318, the instruction module 230 of the drama effect enhancing server 130 utilizes the communication circuit 133 to transmit a first control command to one or more corresponding portable communication devices 120 so as to instruct the one or more portable communication devices 120 to begin displaying corresponding auxiliary image of the first target point of time and to begin playbacking corresponding auxiliary audio data. For the purpose of explanatory convenience in the following description, it is assumed herein that the instruction module 230 utilizes the communication circuit 133 to transmit the first control command to the portable communication device 120-a in the operation 318 to instruct the portable communication device 120-a to begin displaying the first auxiliary image corresponding to the first target point of time and to begin playbacking the corresponding first auxiliary audio data.

In an operation 320, the control circuit 121-a of the portable communication device 120-a utilizes the screen 125-a to display the first auxiliary image and utilizes a speaker 127-a to playback the first auxiliary audio data according to the first control command transmitted from the drama effect enhancing server 130.

When the target video playbacked by the video playback device 110 reaches a second target point of time, it means that another movie plot of the target video is coming soon. At this time, the control circuit 111 of the video playback device 110 performs an operation 322 to utilize the communication circuit 113 to transmit a second trigger notice to the drama effect enhancing server 130.

In an operation 324, the receiving module 240 of the drama effect enhancing server 130 utilizes the communication circuit 133 to receive the second trigger notice transmitted from the portable communication device 120.

In an operation 326, the instruction module 230 of the drama effect enhancing server 130 utilizes the communication circuit 133 to transmit a second control command to one or more corresponding portable communication devices 120 so as to instruct the one or more portable communication devices 120 to begin displaying corresponding auxiliary image of the second target point of time and to begin playbacking corresponding auxiliary audio data. For the purpose of explanatory convenience in the following description, it is assumed herein that the instruction module 230 utilizes the communication circuit 133 to transmit the second control command to the portable communication device 120-n in the operation 326 to instruct the portable communication device 120-n to begin displaying the second auxiliary image corresponding to the second target point of time and to begin playbacking the corresponding second auxiliary audio data.

In an operation 328, the control circuit 121-n of the portable communication device 120-n utilizes the screen 125-n to display the second auxiliary image and utilizes a speaker 127-n to playback the second auxiliary audio data according to the second control command transmitted from the drama effect enhancing server 130.

It can be appreciated from the foregoing descriptions that when a specific movie plot of the target video playbacked by the video playback device 110 is coming, the video playback device 110 transmits a trigger notice to the drama effect enhancing server 130. When the trigger notice is received by the drama effect enhancing server 130, the drama effect enhancing server 130 instructs corresponding portable communication devices 120 to suddenly display auxiliary images corresponding to the movie plot and playback auxiliary audio data corresponding to the movie plot. The multimedia operations of the portable communication devices 120 cooperate with the video and audio effect provided by the video playback device 110 to jointly create more diversified approaches for presenting the video content, thereby enhancing the user's perception of the drama effect of the target video.

For example, when terrible characters (such as monsters, devils, zombies, or walking deads) appear in the target video during the playback of the target video, the producer or director of the target video is enabled to increase the intense feeling of terror by utilizing one or more portable communication devices 120 positioned on or near the user to suddenly playback predesigned auxiliary images (such as a close-up or a stump of the terrible characters) and auxiliary audio data (such as howl of the terrible characters or the victim's screaming).

In another example, when a scene of serial explosion appears in the target video during the playback of the target video, the producer or director of the target video is enabled to enhance the feeling of presence and shocking effect by utilizing one or more portable communication devices 120 positioned on or near the user to suddenly playback predesigned auxiliary images (such as images showing the explosion of some objects in the scene) and auxiliary audio data (such as sound of explosion or dropping objects).

The lasting period for the auxiliary image and auxiliary audio data playbacked by each portable communication device 120 may be adjusted based on the video story or drama effect to be created, and not restricted to a particular pattern.

In the aforementioned embodiment of FIG. 3, the drama effect enhancing server 130 instructs different portable communication devices 120 to begin playbacking different auxiliary images and auxiliary audio data at different points of time, but this is merely an example, rather than a restriction to the practical implementations.

In practice, the drama effect enhancing server 130 may instruct different portable communication devices 120 to begin playbacking the same auxiliary images and auxiliary audio data at the same time.

Alternatively, the drama effect enhancing server 130 may instruct different portable communication devices 120 to begin playbacking different auxiliary images and auxiliary audio data at the same time. For example, in the embodiment shown in FIG. 4, the instruction module 230 of the drama effect enhancing server 130 performs an operation 418 after the first trigger notice transmitted from the portable communication device 120 is received by the receiving module 240. That is, the instruction module 230 performs the operation 418 after the operation 318.

In the operation 418, the instruction module 230 utilizes the communication circuit 133 to transmit the first control command to the portable communication device 120-*a* to instruct the portable communication device 120-*a* to begin displaying the first auxiliary image corresponding to the first target point of time and begin playbacking the corresponding first auxiliary audio data. At the same time, the instruction module 230 utilizes the communication circuit 133 to transmit the second control command to the portable communication device 120-*n* to instruct the portable communication device 120-*n* to begin displaying the second auxiliary image corresponding to the first target point of time and to begin playbacking the corresponding second auxiliary audio data.

Then, the control circuit 121-*a* of the portable communication device 120-*a* performs the operation 320 to utilize the screen 125-*a* to display the first auxiliary image, and to utilize the speaker 127-*a* to playback the first auxiliary audio data. At the same time, the control circuit 121-*n* of the portable communication device 120-*n* also performs the operation 328 to utilize the screen 125-*n* to display the second auxiliary image, and to utilize the speaker 127-*n* to playback the second auxiliary audio data.

The implementations and advantages of other operations in FIG. 4 are the same as the embodiment of FIG. 3. Accordingly, the descriptions regarding the implementations and related advantages for the other operations in FIG. 3 are also applicable to the embodiment of FIG. 4. For simplicity, the descriptions will not be repeated here.

In practice, the content of the first auxiliary image displayed on the screen 125-*a* and the content of the second auxiliary image displayed on the screen 125-*n* may be discontinuous images, or may form a continuous image. Similarly, the first auxiliary audio data playbacked by the speaker 127-*a* and the second auxiliary audio data playbacked by the speaker 127-*n* may be discontinuous sounds or may be continuous sounds.

Figure 5:
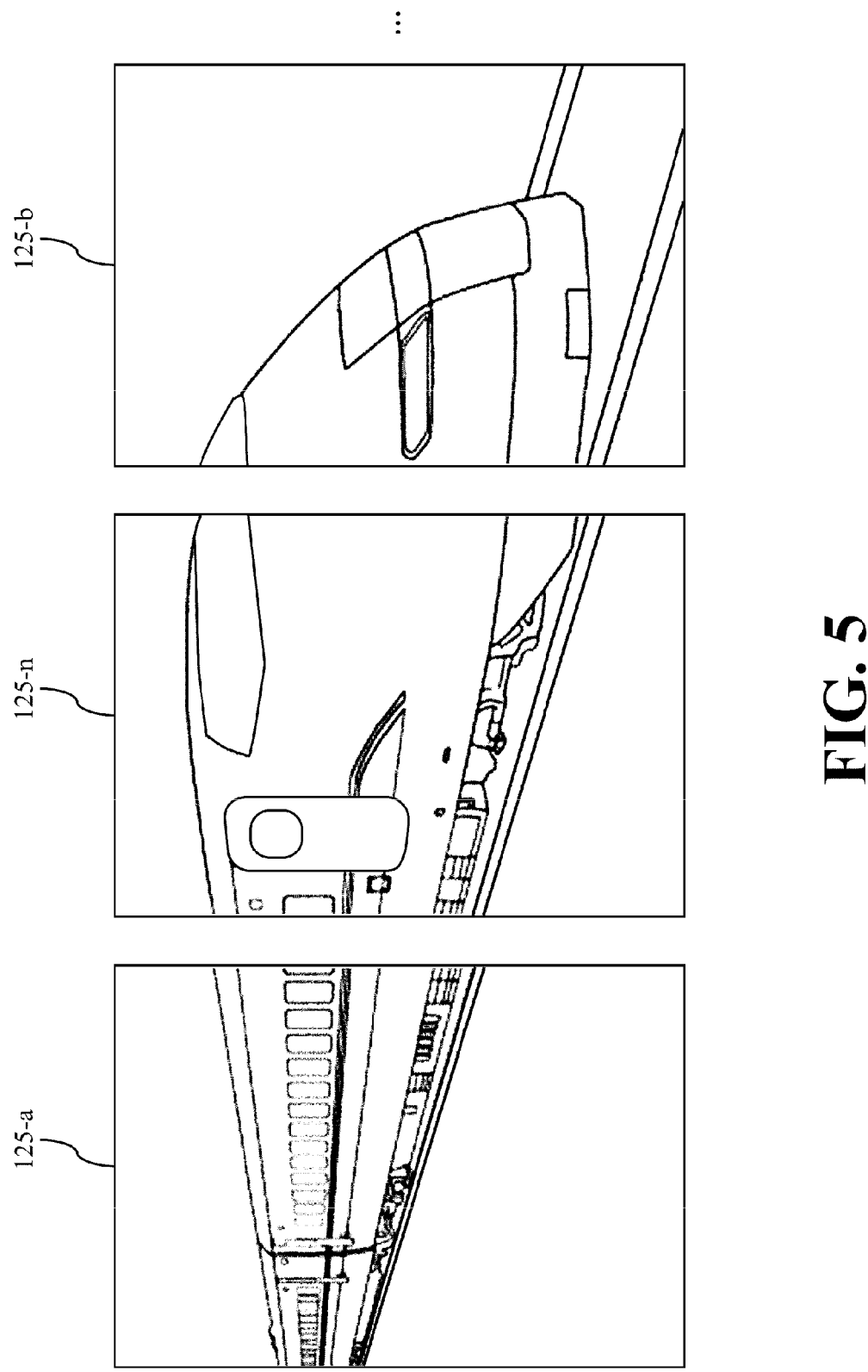
FIG. 5 and FIG. 6 show simplified schematic diagrams of auxiliary images displayed on the screens of different portable communication devices in FIG. 1 according to several embodiments of the present disclosure.
Figure 6:
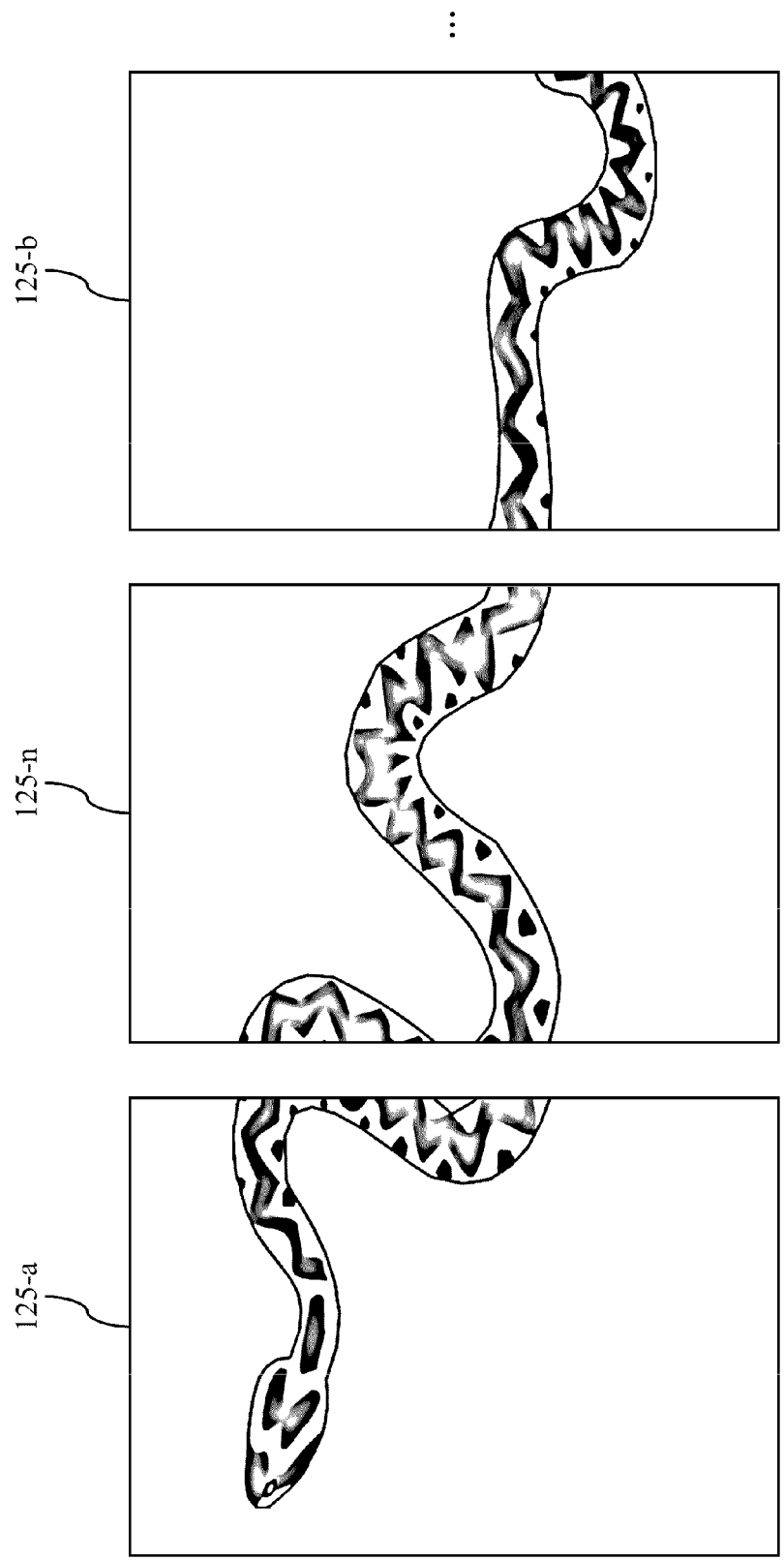

For example, FIG. 5 and FIG. 6 show simplified schematic diagrams of auxiliary images displayed on different screens 125 of different portable communication devices 120 in FIG. 1 according to several embodiments of the present disclosure. As shown in FIG. 5, the auxiliary images displayed at the same time on the screens 125-*a*, 125-*n*, and 125-*b* of the portable communication devices 120-*a*, 120-*n*, and 120-*b* may form a continuous image, such as chasing train illustrated in FIG. 5. In the embodiment of FIG. 5, the train is coming closer from left-side toward right-side of the aforementioned continuous image. Accordingly, the auxiliary audio data that the drama effect enhancing server 130 instructs the portable communication device 120-*a*, the portable communication device 120-*n*, and the portable communication device 120-*b* to playback may be predesigned so that the sound generated by the speaker 127-*a* when playbacking the auxiliary audio data, the sound generated by the speaker 127-*n* when playbacking the auxiliary audio data, and the sound generated by the speaker 127-*b* when playbacking the auxiliary audio data synthesize a stereo sound effect showing that train is running from far to near to cooperate with the continuous image displayed on the screens 125-*a*, 125-*n*, and 125-*b*. As a result, the feeling of presence and stereo sound field can be further improved when the user watching the target video.

For another example, in the embodiment of FIG. 6, the auxiliary images displayed at the same time on the screens 125-*a*, 125-*n*, and 125-*b* of the portable communication devices 120-*a*, 120-*n*, and 120-*b* form a continuous image of a moving giant snake. As shown in FIG. 6, the giant snake is moving from right-side toward left-side of the aforementioned continuous image. Accordingly, the drama effect enhancing server 130 may create a drama effect of that the giant snake suddenly appears near the user by instructing the portable communication device 120-*a*, the portable communication device 120-*n*, and the portable communication device 120-*b* to suddenly begin displaying the aforementioned continuous image in order to increase the scaring effect.

Figure 7:
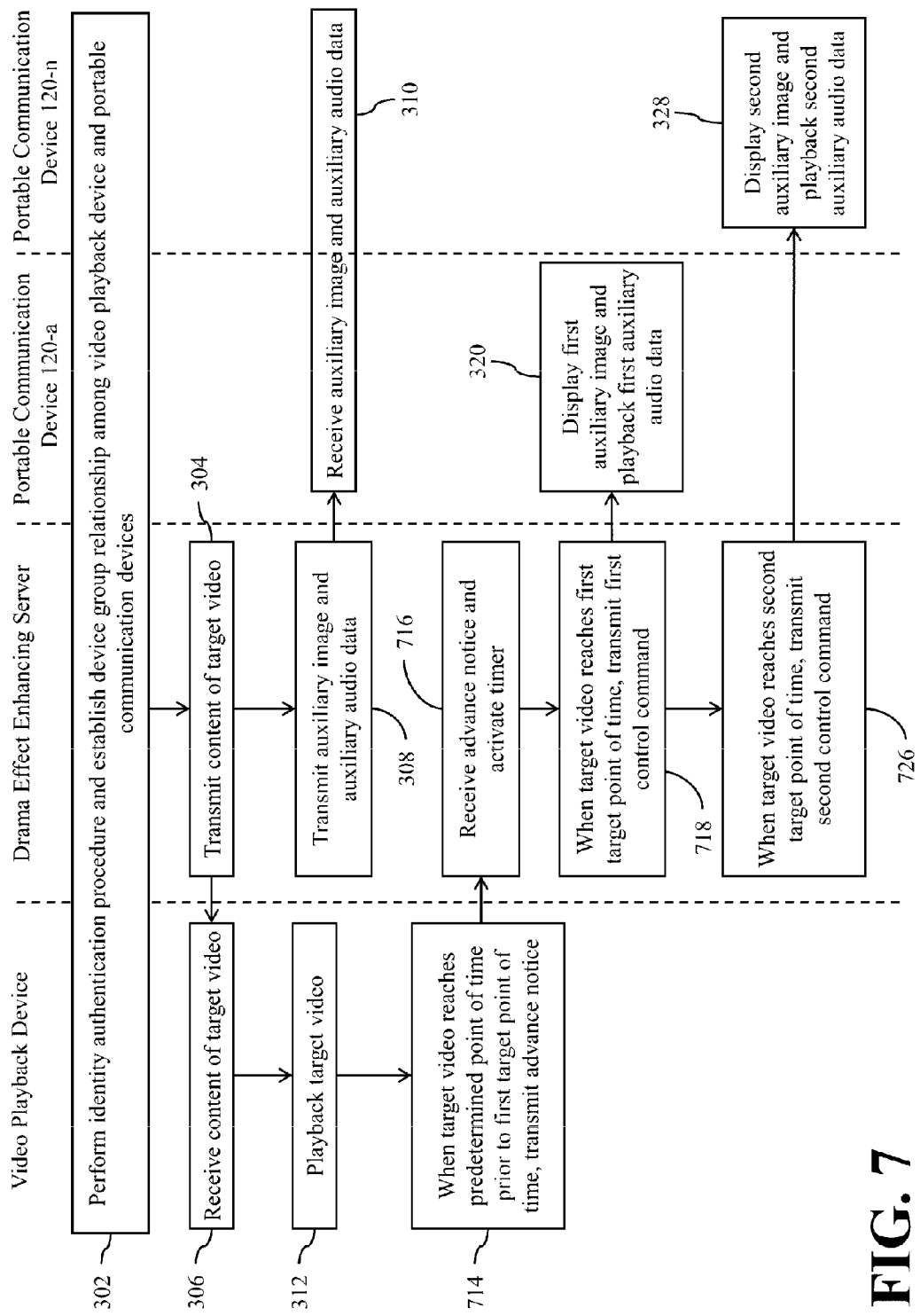
FIG. 7 and FIG. 8 show simplified flowcharts illustrating video playback methods for enhancing drama effect according to several embodiments of the present disclosure.
Figure 8:
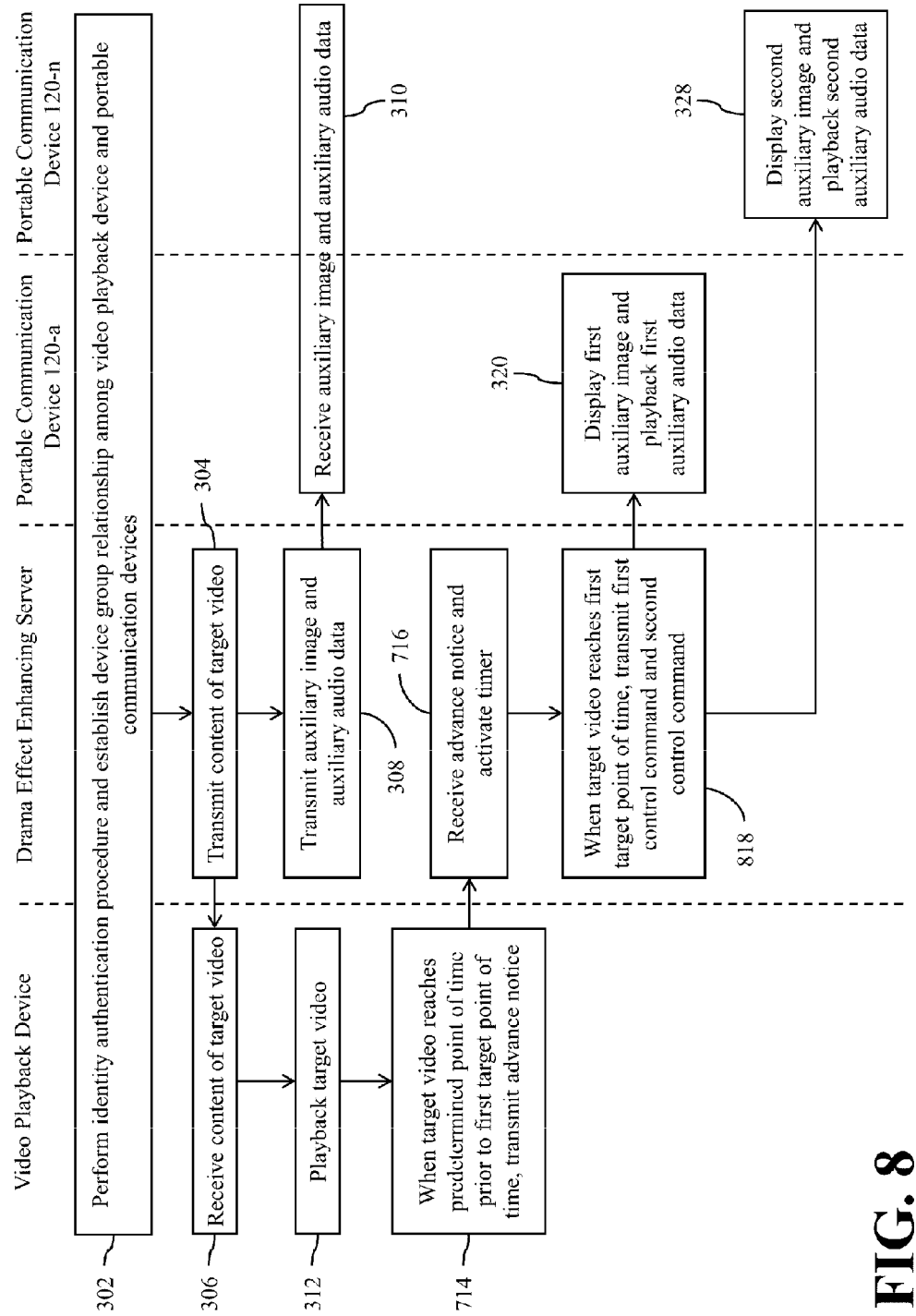

FIG. 7 and FIG. 8 show simplified flowcharts illustrating video playback methods for enhancing drama effect according to several embodiments of the present disclosure.

As shown in FIG. 7, in the operation 312 the control circuit 111 of the video playback device 110 also utilizes the main display 115 and the speaker 117 to playback the video and audio content of the target video for the users of the portable communication devices 120-*a*~120-*n* to watch.

In the embodiment of FIG. 7, when the target video playbacked by the video playback device 110 reaches a predetermined point of time prior to the first target point of time, the control circuit 111 of the video playback device 110 performs an operation 714 to utilize the communication circuit 113 to transmit an advance notice to the drama effect enhancing server 130. In practice, the predetermined point of time may be the starting point of time of the target video, or may be a pre-negotiated point of time with a fixed time length ahead to a specific movie plot. For example, the predetermined point of time may be a time point with 5 seconds or 10 seconds ahead to the specific movie plot.

In an operation 716, the receiving module 240 of the drama effect enhancing server 130 utilizes the communication circuit 133 to receive the advance notice transmitted from the portable communication device 120. The producer or director of the target video may pre-configure a time length of a period between the aforementioned predetermined point of time and the specific movie plot, and store the time length in the database 140. Accordingly, when the receiving module 240 receives the advance notice, the instruction module 230 of the drama effect enhancing server 130 activates a timer.

When the target video playbacked on the main display 115 of the video playback device 110 reaches the aforementioned first target point of time, the instruction module 230 performs an operation 718 to utilize the communication circuit 133 to transmit the first control command to one or more corresponding portable communication devices 120 to instruct the one or more portable communication devices 120 to begin displaying auxiliary images corresponding to the first target point of time and to begin playbacking corresponding auxiliary audio data. For the purpose of explanatory convenience in the following description, it is also assumed herein that the instruction module 230 utilizes the communication circuit 133 to transmit the first control command to the portable communication device 120-a in the operation 718 to instruct the portable communication device 120-a to begin displaying the first auxiliary image corresponding to the first target point of time and to begin playbacking the corresponding first auxiliary audio data.

When the target video playbacked by the video playback device 110 reaches the aforementioned second target point of time, the instruction module 230 utilizes the communication circuit 133 to transmit the second control command to one or more corresponding portable communication devices 120 to instruct the one or more portable communication devices 120 to begin displaying auxiliary images corresponding to the second target point of time and to begin playbacking corresponding auxiliary audio data. For the purpose of explanatory convenience in the following description, it is also assumed herein that the instruction module 230 utilizes the communication circuit 133 to transmit the second control command to the portable communication device 120-n in the operation 726 to instruct the portable communication device 120-n to begin displaying the second auxiliary image corresponding to the second target point of time and to begin playbacking the corresponding second auxiliary audio data.

In this embodiment, the instruction module 230 may determine that the target video currently playbacked on the main display 115 reaches the first target point of time after a first predetermined period since the advance notice is received by the receiving module 240, and perform the aforementioned operation 718. In addition, the instruction module 230 may determine that the target video currently playbacked on the main display 115 reaches the second target point of time after a second predetermined period since the advance notice is received by the receiving module 240, and perform the aforementioned operation 726.

The implementations and advantages of other operations in FIG. 7 are the same as the embodiment of FIG. 3. Accordingly, the descriptions regarding the implementations and related advantages for the other operations in FIG. 3 are also applicable to the embodiment of FIG. 7. For simplicity, the descriptions will not be repeated here.

It can be appreciated from the foregoing descriptions that at a time point with a fixed period ahead to the appearance of a specific movie plot of the target video playbacked by the video playback device 110, the video playback device 110 transmits an advance notice to the drama effect enhancing server 130. When the advance notice is received by the drama effect enhancing server 130, the drama effect enhancing server 130 activates a timer. When the drama effect enhancing server 130 determines that the specific movie plot is coming based on the timer operation, the drama effect enhancing server 130 instructs corresponding portable communication devices 120 to suddenly display auxiliary images corresponding to the movie plot and playback auxiliary audio data corresponding to the movie plot. The multimedia operations of the portable communication devices 120 cooperate with the video and audio effect provided by the video playback device 110 to jointly create more diversified approaches for presenting the video content, thereby enhancing the user's perception of the drama effect of the target video.

Similar to the previous embodiments, the drama effect enhancing server 130 may instruct different portable communication devices 120 to begin playbacking different auxiliary images and auxiliary audio data at the same time. In the embodiment of FIG. 8, for example, the instruction module 230 of the drama effect enhancing server 130 activates the timer when the advance notice transmitted from the portable communication device 120 is received by the receiving module 240. That is, the instruction module 230 activates the timer in the operation 716.

When the instruction module 230 determines that the target video playbacked on the main display 115 of the video playback device 110 reaches the aforementioned first target point of time based on the timer operation, the instruction module 230 performs an operation 818.

In the operation 818, the instruction module 230 utilizes the communication circuit 133 to transmit the first control command to the portable communication device 120-a to instruct the portable communication devices 120-a to begin displaying the first auxiliary image corresponding to the first target point of time and to begin playbacking the corresponding first auxiliary audio data. At the same time, the instruction module 230 utilizes the communication circuit 133 to transmit the second control command to the portable communication device 120-n to instruct the portable communication device 120-n to begin displaying the second auxiliary image corresponding to the first target point of time and to begin playbacking the corresponding second auxiliary audio data.

Then, the portable communication device 120-a performs the operation 320, and the portable communication device 120-n performs the operation 328 at the same time.

The implementations and advantages of other operations in FIG. 8 are the same as the embodiments of FIG. 3 and FIG. 7. Accordingly, the descriptions regarding the implementations and related advantages for the other operations in FIG. 3 and FIG. 7 are also applicable to the embodiment of FIG. 8. For simplicity, the descriptions will not be repeated here.

In the embodiments where the video playback system 100 comprises multiple portable communication devices 120, the drama effect enhancing server 130 may instruct the users of the portable communication devices 120-a~120-n to arrange the portable communication devices 120-a~120-n in an order instructed by the drama effect enhancing server 130 in the operation 302, so that the auxiliary images displayed on different screens 125 of different portable communication devices 120 can form a continuous image so as to create a special drama effect similar to that illustrated previously.

Alternatively, a location detection circuit may be arranged in the proposed video playback system to automatically detect respective positions of the portable communication devices 120-a~120-n, so that the drama effect enhancing server 130 is allowed to dynamically select one or more portable communication devices 120 to receive and playback specific auxiliary image and auxiliary audio data according to a relative position among the portable communication devices 120-*a*~120-*n*.

Figure 9:
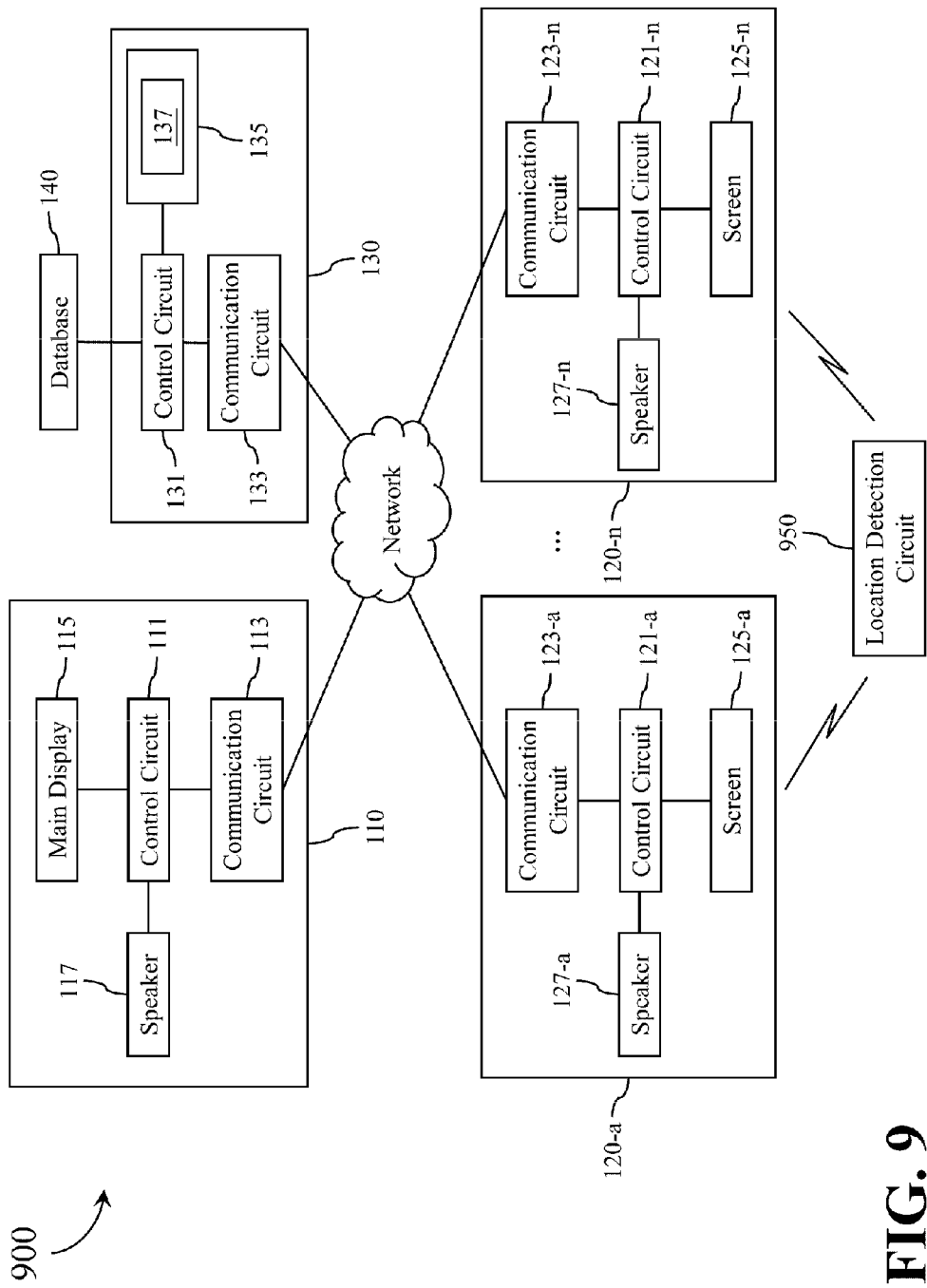
FIG. 9 shows a simplified functional block diagram of a video playback system according to another embodiment of the present disclosure.

For example, FIG. 9 shows a simplified functional block diagram of a video playback system 900 according to another embodiment of the present disclosure. In compared with the video playback system 100, the video playback system 900 further comprises a location detection circuit 950. While the video playback device 110 playbacks the target video, the location detection circuit 950 may automatically detect a relative position among the video playback device 110 and the portable communication devices 120-*a*~120-*n* to generate information related to a relative position among the video playback device 110 and the portable communication devices 120-*a*~120-*n*, and transmit detection results to the video playback device 110 or at least one of the portable communication devices 120-*a*~120-*n* by using a wireless transmission approach. Then, the detection results are transmitted to the drama effect enhancing server 130 via the video playback device 110 or at least one of the portable communication devices 120-*a*~120-*n*. In practice, the location detection circuit 950 may be realized with various existing object positioning circuits, such as one or more magnetic sensor circuits, ultrasonic positioning circuits, infrared sensing circuits, image sensing and identifying circuits, Wi-Fi signal positioning circuits, motion detecting circuits, indoor GPS circuits, posture sensing circuits, or the like. In addition, the location detection circuit 950 may be positioned above the video playback device 110 and all of the portable communication devices 120-*a*~120-*n*, such as be positioned at a ceiling, so that a position of the location detection circuit 950 is higher than positions of the video playback device 110 and all of the portable communication devices 120-*a*~120-*n* in order to enhance the location detecting accuracy.

In the drama effect enhancing server 130 of the video playback system 900, the receiving module 240 of the computer program product 137 utilizes the communication circuit 133 to dynamically receive the location detection results transmitted from the video playback device 110 or at least one of the portable communication devices 120-*a*~120-*n*.

The instruction module 230 of the drama effect enhancing server 130 may dynamically decide the transmission destinations of multiple auxiliary images and auxiliary audio data corresponding to a specific point of time in the operation 308 of each of the previous embodiments according to the location detection results received by the receiving module 240. As a result, even if the user of the portable communication devices 120-*a*~120-*n* changes the relative position among the portable communication devices 120-*a*~120-*n* while watching the target video, the video playback system 900 is still capable of correctly displaying corresponding auxiliary images on different screens 125 of different portable communication devices 120 to form a continuous image.

The other functional blocks of the video playback system 900 are the same as corresponding functional blocks in the aforementioned video playback system 100. Accordingly, the descriptions regarding the implementations and related advantages of other operations in the aforementioned FIG. 3, FIG. 4, FIG. 7, and FIG. 9 are also applicable to the video playback system 900. For simplicity, the descriptions will not be repeated here.

In practice, the mapping relationship between the timeline of playbacking each movie plot of the target video and the timeline of playbacking corresponding auxiliary image and auxiliary audio data may be pre-stored in the database 140 or the drama effect enhancing server. In this situation, the drama effect enhancing server 130 is capable of self-determining when to instruct the portable communication device 120 to begin displaying the auxiliary image and to begin playbacking the auxiliary audio data without the need to receive the trigger notice or the advance notice from the video playback device 110.

The executing order of the operations of each of the aforementioned flowcharts is merely an example, rather than a restriction to the practical implementations. For example, in each of the aforementioned flowcharts, the operation 308 may be performed simultaneously with the operation 304 or the operation 312. In addition, if the relative position among the portable communication devices 120-*a*~120-*n* changes during the playback of the target video, then the drama effect enhancing server 130 may repeat the aforementioned operation 308 to update the auxiliary image and auxiliary audio data stored in the portable communication devices 120.

Additionally, some portable communication devices 120 may be provided with additional sensation effect generating devices, such as a vibrator, a luminance device (e.g., a LED device), and an odor storage device. The structure of proposed video playback systems 100 and 900 is also capable of supporting the video producer or director to utilize these additional sensation effect generating devices to create more drama effects. For example, when the target video playback on the main display 115 of the video playback device 110 reaches the aforementioned first target point of time, the instruction module 230 of the drama effect enhancing server 130 may instruct the portable communication device 120 to utilize the vibrator to vibrate at a predetermined mode, to utilize the luminance device to illuminate in a predetermined pattern, to utilize the odor storage device to release a predetermined odor, or to perform at least one of the above operations. The operation of the additional sensation effect generating devices cooperates with the audio and video effect provided by the video playback device 110 to jointly create more diversified approaches for presenting the video content, thereby enhancing the user's perception of the drama effect of the target video.

It can be appreciated from the foregoing descriptions that the proposed video playback systems 100 and 900 enable the video producer or director to utilize the popular portable communication devices as tools for creating drama effects, so that the way for presenting the video content is no longer restricted to the traditional hardware installed in the movie theaters or the traditional home theater systems. The proposed video playback systems 100 and 900 greatly increase the selection flexibility and variety of the tools for creating drama effects. For example, when a specific movie plot of the target video appears while the video playback device 110 playbacks the target video, the drama effect enhancing server 130 is enabled to instruct corresponding portable communication device 120 to suddenly display corresponding auxiliary image of the movie plot, to playback auxiliary audio data corresponding to the movie plot, to vibrate, to illuminate, or to release corresponding odor in order to deliver more rich experience of the drama content. As a result, the drama effect of the target video can be effectively enhanced, and the users would obtain more rich and more different experience in watching videos.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to" Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A video playback system for enhancing drama effect, comprising:
    a video playback device, comprising a main display configured to operably playback a target video;
    a first portable communication device, comprising a first screen configured to operably display a first auxiliary image;
    a second portable communication device, comprising a second screen configured to operably display a second auxiliary image; and
    a drama effect enhancing server, configured to operably transmit content of the target video to the video playback device via a network, to operably transmit the first auxiliary image and a first auxiliary audio data to the first portable communication device via a network, and to operably transmit the second auxiliary image and a second auxiliary audio data different from the first auxiliary audio data to the second portable communication device via a network;
    wherein when the target video playbacked on the main display reaches a first target point of time, the video playback device transmits a trigger notice to the drama effect enhancing server via a network, and when the trigger notice is received by the drama effect enhancing server, the drama effect enhancing server instructs the first portable communication device to utilize the first screen to begin displaying the first auxiliary image and instructs the first portable communication device to begin playbacking the first auxiliary audio data, and when the target video playbacked on the main display reaches a second target point of time different from the first target point of time, the drama effect enhancing server instructs the second portable communication device to utilize the second screen to begin displaying the second auxiliary image and instructs the second portable communication device to begin playbacking the second auxiliary audio data.

2. The video playback system of claim 1, further comprising:
    a location detection circuit, configured to dynamically detect a relative position among the video playback device, the first portable communication device, and the second portable communication device, and to operably transmit detection results to the drama effect enhancing server via at least one of the video playback device, the first portable communication device, and the second portable communication device.

3. A video playback system for enhancing drama effect, comprising:
    a video playback device, comprising a main display configured to operably playback a target video;
    a first portable communication device, comprising a first screen configured to operably display a first auxiliary image;
    a second portable communication device, comprising a second screen configured to operably display a second auxiliary image; and
    a drama effect enhancing server, configured to operably transmit content of the target video to the video playback device via a network, to operably transmit the first auxiliary image and a first auxiliary audio data to the first portable communication device via a network, and to operably transmit the second auxiliary image and a second auxiliary audio data different from the first auxiliary audio data to the second portable communication device via a network;
    wherein when the target video playbacked on the main display reaches a first target point of time, the video playback device transmits a trigger notice to the drama effect enhancing server via a network, and when the trigger notice is received by the drama effect enhancing server, the drama effect enhancing server instructs the first portable communication device to utilize the first screen to begin displaying the first auxiliary image, instructs the first portable communication device to begin playbacking the first auxiliary audio data, instructs the second portable communication device to utilize the second screen to begin displaying the second auxiliary image, and instructs the second portable communication device to begin playbacking the second auxiliary audio data.

4. The video playback system of claim 3, wherein content of the first auxiliary image displayed on the first screen and content of the second auxiliary image displayed on the second screen form a continuous image.

5. The video playback system of claim 3, wherein sound generated by the first portable communication device when playbacking the first auxiliary audio data and sound generated by the second portable communication device when playbacking the second auxiliary audio data synthesize a stereo sound effect.

6. The video playback system of claim 5, further comprising:
    a location detection circuit, configured to dynamically detect a relative position among the video playback device, the first portable communication device, and the second portable communication device, and to operably transmit detection results to the drama effect enhancing server via at least one of the video playback device, the first portable communication device, and the second portable communication device.

7. A video playback system for enhancing drama effect, comprising:
    a video playback device, comprising a main display configured to operably playback a target video;
    a first portable communication device, comprising a first screen configured to operably display a first auxiliary image;
    a second portable communication device, comprising a second screen configured to operably display a second auxiliary image; and a drama effect enhancing server, configured to operably transmit content of the target video to the video playback device via a network, to operably transmit the first auxiliary image and a first auxiliary audio data to the first portable communication device via a network, and to operably transmit the second auxiliary image and a second auxiliary audio data different from the first auxiliary audio data to the second portable communication device via a network;

wherein when the target video playbacked on the main display reaches a first target point of time, the drama effect enhancing server instructs the first portable communication device to utilize the first screen to begin displaying the first auxiliary image and instructs the first portable communication device to begin playbacking the first auxiliary audio data, and when the target video playbacked on the main display reaches a second target point of time different from the first target point of time, the drama effect enhancing server instructs the second portable communication device to utilize the second screen to begin displaying the second auxiliary image and instructs the second portable communication device to begin playbacking the second auxiliary audio data;

wherein when the target video playbacked on the main display reaches a predetermined point of time prior to the first target point of time, the video playback device transmits an advance notice to the drama effect enhancing server via a network, and the drama effect enhancing server determines that the target video playbacked on the main display reaches the first target point of time after a predetermined period since the advance notice is received by the drama effect enhancing server.

8. The video playback system of claim 7, further comprising:
a location detection circuit, configured to operably detect a relative position among the video playback device, the first portable communication device, and the second portable communication device, and to operably transmit detection results to the drama effect enhancing server via at least one of the video playback device, the first portable communication device, and the second portable communication device.

9. A video playback system for enhancing drama effect, comprising:
a video playback device, comprising a main display configured to operably playback a target video;
a first portable communication device, comprising a first screen configured to operably display a first auxiliary image;
a second portable communication device, comprising a second screen configured to operably display a second auxiliary image; and
a drama effect enhancing server, configured to operably transmit content of the target video to the video playback device via a network, to operably transmit the first auxiliary image and a first auxiliary audio data to the first portable communication device via a network, and to operably transmit the second auxiliary image and a second auxiliary audio data different from the first auxiliary audio data to the second portable communication device via a network;

wherein when the target video playbacked on the main display reaches a first target point of time, the drama effect enhancing server instructs the first portable communication device to utilize the first screen to begin displaying the first auxiliary image, instructs the first portable communication device to begin playbacking the first auxiliary audio data, instructs the second portable communication device to utilize the second screen to begin displaying the second auxiliary image, and instructs the second portable communication device to begin playbacking the second auxiliary audio data;

wherein when the target video playbacked on the main display reaches a predetermined point of time prior to the first target point of time, the video playback device transmits an advance notice to the drama effect enhancing server via a network, and the drama effect enhancing server determines that the target video playbacked on the main display reaches the first target point of time after a predetermined period since the advance notice is received by the drama effect enhancing server.

10. The video playback system of claim 9, wherein content of the first auxiliary image displayed on the first screen and content of the second auxiliary image displayed on the second screen form a continuous image.

11. The video playback system of claim 9, wherein sound generated by the first portable communication device when playbacking the first auxiliary audio data and sound generated by the second portable communication device when playbacking the second auxiliary audio data synthesize a stereo sound effect.

12. The video playback system of claim 11, further comprising:
a location detection circuit, configured to dynamically detect a relative position among the video playback device, the first portable communication device, and the second portable communication device, and to operably transmit detection results to the drama effect enhancing server via at least one of the video playback device, the first portable communication device, and the second portable communication device.

13. The video playback system of claim 9, wherein the first portable communication device further comprises at least one of a vibrator, a luminance device, and an odor storage device, and when the target video playbacked on the main display reaches the first target point of time, the drama effect enhancing server instructs the first portable communication device to perform at least one of the following operations:
utilizing the vibrator to vibrate at a predetermined mode;
utilizing the luminance device to illuminate in a predetermined pattern; and
utilizing the odor storage device to release a predetermined odor.

14. A computer program product, stored in a non-transitory storage device of a drama effect enhancing server, when executed by a control circuit of the drama effect enhancing server, enabling the drama effect enhancing server to perform a video playback operation for enhancing drama effect, the computer program product comprising:
a video providing module, configured to operably transmit content of a target video to a video playback device comprising a main display, so that the video playback device utilizes the main display to playback the target video;
an auxiliary data providing module, configured to operably transmit a first auxiliary image to a first portable communication device comprising a first screen;
an instruction module, configured to operably instruct the first portable communication device to utilize the first screen to begin displaying the first auxiliary image when the target video playbacked on the main display reaches a first target point of time; and
a receiving module, configured to operably receive a trigger notice transmitted from the video playback device via a network when the target video playbacked on the main display reaches the first target point of time;

wherein when the trigger notice is received by the instruction module, the instruction module instructs the first portable communication device to utilize the first screen to begin displaying the first auxiliary image;

wherein the auxiliary data providing module further transmits a second auxiliary image to a second portable communication device comprising a second screen, and when the target video playbacked on the main display reaches a second target point of time different from the first target point of time, the instruction module instructs the second portable communication device to utilize the second screen to begin displaying the second auxiliary image;

wherein the auxiliary data providing module further transmits a first auxiliary audio data to the first portable communication device, and transmits a second auxiliary audio data different from the first auxiliary audio data to the second portable communication device;

wherein when the target video playbacked on the main display reaches the first target point of time, the instruction module instructs the first portable communication device to begin playbacking the first auxiliary audio data, and when the target video playbacked on the main display reaches the second target point of time, the instruction module instructs the second portable communication device to begin playbacking the second auxiliary audio data.

15. The computer program product of claim 14, wherein the receiving module receives information related to a relative position among the video playback device, the first portable communication device, and the second portable communication device via at least one of the video playback device, the first portable communication device, and the second portable communication device.

16. A computer program product, stored in a non-transitory storage device of a drama effect enhancing server, when executed by a control circuit of the drama effect enhancing server, enabling the drama effect enhancing server to perform a video playback operation for enhancing drama effect, the computer program product comprising:

a video providing module, configured to operably transmit content of a target video to a video playback device comprising a main display, so that the video playback device utilizes the main display to playback the target video;

an auxiliary data providing module, configured to operably transmit a first auxiliary image to a first portable communication device comprising a first screen;

an instruction module, configured to operably instruct the first portable communication device to utilize the first screen to begin displaying the first auxiliary image when the target video playbacked on the main display reaches a first target point of time; and a receiving module, configured to operably receive a trigger notice transmitted from the video playback device via a network when the target video playbacked on the main display reaches the first target point of time;

wherein when the trigger notice is received by the instruction module, the instruction module instructs the first portable communication device to utilize the first screen to begin displaying the first auxiliary image;

wherein the auxiliary data providing module further transmits a second auxiliary image to a second portable communication device comprising a second screen, and when the target video playbacked on the main display reaches the first target point of time, the instruction module instructs the second portable communication device to utilize the second screen to begin displaying the second auxiliary image;

wherein the auxiliary data providing module further transmits a first auxiliary audio data to the first portable communication device, and transmits a second auxiliary audio data different from the first auxiliary audio data to the second portable communication device;

wherein when the target video playbacked on the main display reaches the first target point of time, the instruction module instructs the first portable communication device to begin playbacking the first auxiliary audio data, and instructs the second portable communication device to begin playbacking the second auxiliary audio data.

17. The computer program product of claim 16, wherein content of the first auxiliary image displayed on the first screen and content of the second auxiliary image displayed on the second screen form a continuous image.

18. The computer program product of claim 16, wherein sound generated by the first portable communication device when playbacking the first auxiliary audio data and sound generated by the second portable communication device when playbacking the second auxiliary audio data synthesize a stereo sound effect.

19. The computer program product of claim 18, wherein the receiving module receives information related to a relative position among the video playback device, the first portable communication device, and the second portable communication device via at least one of the video playback device, the first portable communication device, and the second portable communication device.

20. A computer program product, stored in a non-transitory storage device of a drama effect enhancing server, when executed by a control circuit of the drama effect enhancing server, enabling the drama effect enhancing server to perform a video playback operation for enhancing drama effect, the computer program product comprising:

a video providing module, configured to operably transmit content of a target video to a video playback device comprising a main display, so that the video playback device utilizes the main display to playback the target video;

an auxiliary data providing module, configured to operably transmit a first auxiliary image to a first portable communication device comprising a first screen;

an instruction module, configured to operably instruct the first portable communication device to utilize the first screen to begin displaying the first auxiliary image when the target video playbacked on the main display reaches a first target point of time; and a receiving module, configured to operably receive an advance notice transmitted from the video playback device via a network when the target video playbacked on the main display reaches a predetermined point of time prior to the first target point of time;

wherein the instruction module determines that the target video playbacked on the main display reaches the first target point of time after a predetermined period since the advance notice is received by the instruction module;

wherein the auxiliary data providing module further transmits a second auxiliary image to a second portable communication device comprising a second screen, and when the target video playbacked on the main display reaches a second target point of time different from the first target point of time, the instruction module instructs the second portable communication device to utilize the second screen to begin displaying the second auxiliary image;

wherein the auxiliary data providing module further transmits a first auxiliary audio data to the first portable communication device, and transmits a second auxiliary audio data different from the first auxiliary audio data to the second portable communication device;

wherein when the target video playbacked on the main display reaches the first target point of time, the instruction module instructs the first portable communication device to begin playbacking the first auxiliary audio data, and when the target video playbacked on the main display reaches the second target point of time, the instruction module instructs the second portable communication device to begin playbacking the second auxiliary audio data.

21. The computer program product of claim 20, wherein the receiving module receives information related to a relative position among the video playback device, the first portable communication device, and the second portable communication device via at least one of the video playback device, the first portable communication device, and the second portable communication device.

22. A computer program product, stored in a non-transitory storage device of a drama effect enhancing server, when executed by a control circuit of the drama effect enhancing server, enabling the drama effect enhancing server to perform a video playback operation for enhancing drama effect, the computer program product comprising:

a video providing module, configured to operably transmit content of a target video to a video playback device comprising a main display, so that the video playback device utilizes the main display to playback the target video;

an auxiliary data providing module, configured to operably transmit a first auxiliary image to a first portable communication device comprising a first screen;

an instruction module, configured to operably instruct the first portable communication device to utilize the first screen to begin displaying the first auxiliary image when the target video plavbacked on the main display reaches a first target point of time; and a receiving module, configured to operably receive an advance notice transmitted from the video playback device via a network when the target video playbacked on the main display reaches a predetermined point of time prior to the first target point of time;

wherein the instruction module determines that the target video playbacked on the main display reaches the first target point of time after a predetermined period since the advance notice is received by the instruction module;

wherein the auxiliary data providing module further transmits a second auxiliary image to a second portable communication device comprising a second screen, and when the target video playbacked on the main display reaches the first target point of time, the instruction module instructs the second portable communication device to utilize the second screen to begin displaying the second auxiliary image;

wherein the auxiliary data providing module further transmits a first auxiliary audio data to the first portable communication device, and transmits a second auxiliary audio data different from the first auxiliary audio data to the second portable communication device;

wherein when the target video playbacked on the main display reaches the first target point of time, the instruction module instructs the first portable communication device to begin plavbacking the first auxiliary audio data, and instructs the second portable communication device to begin playbacking the second auxiliary audio data.

23. The computer program product of claim 22, wherein content of the first auxiliary image displayed on the first screen and content of the second auxiliary image displayed on the second screen form a continuous image.

24. The computer program product of claim 22, wherein sound generated by the first portable communication device when playbacking the first auxiliary audio data and sound generated by the second portable communication device when playbacking the second auxiliary audio data synthesize a stereo sound effect.

25. The computer program product of claim 24, wherein the receiving module receives information related to a relative position among the video playback device, the first portable communication device, and the second portable communication device via at least one of the video playback device, the first portable communication device, and the second portable communication device.

26. The computer program product of claim 22, wherein the first portable communication device further comprises at least one of a vibrator, a luminance device, and an odor storage device, and when the target video playbacked on the main display reaches the first target point of time, the instruction module instructs the first portable communication device to perform at least one of the following operations:

utilizing the vibrator to vibrate at a predetermined mode;
utilizing the luminance device to illuminate in a predetermined pattern; and
utilizing the odor storage device to release a predetermined odor.

* * * * *

UNITED STATES PATENT AND TRADEMARK OFFICE
CERTIFICATE OF CORRECTION

| | |
|---|---|
| PATENT NO. | : 8,855,462 B2 |
| APPLICATION NO. | : 13/845970 |
| DATED | : October 7, 2014 |
| INVENTOR(S) | : Siu-Leong Yu et al. |

It is certified that error appears in the above-identified patent and that said Letters Patent is hereby corrected as shown below:

ON THE TITLE PAGE:

Item (72), Inventors, change "Siu-Leong Yu, Zhubei (TV)" to --Siu-Leong Yu, Zhubei (TW)--.

Signed and Sealed this
Third Day of March, 2015

Michelle K. Lee
*Deputy Director of the United States Patent and Trademark Office*